(12) United States Patent
Lahaie et al.

(10) Patent No.: US 9,103,848 B2
(45) Date of Patent: Aug. 11, 2015

(54) SYSTEM AND METHOD FOR DETECTING AND MEASURING IMPACTS IN HANDHELD DEVICES USING AN ACOUSTIC TRANSDUCER

(71) Applicant: BlackBerry Limited, Waterloo (CA)

(72) Inventors: Denis Lahaie, Waterloo (CA); Sheldon Terry Schwandt, Waterloo (CA)

(73) Assignee: BlackBerry Limited, Waterloo (CA)

( * ) Notice: Subject to any disclaimer, the term of this patent is extended or adjusted under 35 U.S.C. 154(b) by 112 days.

(21) Appl. No.: 14/059,478

(22) Filed: Oct. 22, 2013

(65) Prior Publication Data

US 2014/0046622 A1    Feb. 13, 2014

Related U.S. Application Data

(63) Continuation of application No. 12/955,037, filed on Nov. 29, 2010, now Pat. No. 8,589,089.

(51) Int. Cl.
| | |
|---|---|
| *G01L 1/00* | (2006.01) |
| *G01P 15/00* | (2006.01) |
| *G01P 15/08* | (2006.01) |
| *G01P 1/12* | (2006.01) |

(52) U.S. Cl.
CPC . *G01P 15/00* (2013.01); *G01L 1/00* (2013.01); *G01P 1/127* (2013.01); *G01P 15/0891* (2013.01)

(58) Field of Classification Search
CPC . G01M 5/0091; Y10T 29/49117; F41H 5/007
USPC .................................. 702/41, 182–185, 188
See application file for complete search history.

(56) References Cited

U.S. PATENT DOCUMENTS

| | | | |
|---|---|---|---|
| 7,275,412 B2 | 10/2007 | Nishihara et al. | |
| 2004/0203500 A1 | 10/2004 | Wong | |
| 2006/0227984 A1 | 10/2006 | Sinclair | |
| 2008/0022780 A1* | 1/2008 | Jensen et al. | 73/800 |
| 2009/0309745 A1 | 12/2009 | Johnson | |
| 2010/0231538 A1 | 9/2010 | Liao | |

FOREIGN PATENT DOCUMENTS

| | | |
|---|---|---|
| EP | 1286166 A1 | 2/2003 |
| JP | 2006292673 A | 10/2006 |

OTHER PUBLICATIONS

Canadian Intellectual Property Office, Office Action Dated Apr. 16, 2014, issued in corresponding Canadian Patent Application No. 2,759,668.

(Continued)

*Primary Examiner* — Edward Raymond
(74) *Attorney, Agent, or Firm* — Ridout & Maybee LLP

(57) ABSTRACT

A system and method is provided for detecting and measuring impacts in a wireless device. The wireless device has a processor coupled to a memory and an acoustic transducer. The method comprises acquiring data from the acoustic transducer, the data acquisition including the processor taking samples of an electrical input signal supplied to an input of the processor by the acoustic transducer; saving the acquired data in the memory; detecting whether an impact has occurred; and halting data acquisition after the impact is detected.

20 Claims, 5 Drawing Sheets

(56) References Cited

OTHER PUBLICATIONS

European Patent Office, "Extended European Search Report" for corresponding EP Patent Application No. 10193020.4 dated May 4, 2011, Germany.

Webster, J. et al., "A Computerized Non-Contacting NDT System using an Impacting Acoustic Wave Applied to Detecting Corrosion and Subsurface Defects in Composite and Metal Structures", Internet Article, Jan. 1999, http://www.ndt.net/article/pacndt98/42/42.htm.

Globalspec.com, "Search Results for Acoustic Impact Testing", Internet Search Results, Oct. 13, 2011, http://www.globalspec.com/Industrial-Directory/acoustic_impact_testing.

Untied States Patent and Trademark Office, Office Action Dated Mar. 28, 2013, issued in corresponding U.S. Appl. No. 12/955,037.

Untied States Patent and Trademark Office, Notice of Allowance Dated Oct. 21, 2013, issued in corresponding U.S. Appl. No. 12/955,037.

* cited by examiner

SYSTEM AND METHOD FOR DETECTING AND MEASURING IMPACTS IN HANDHELD DEVICES USING AN ACOUSTIC TRANSDUCER

CROSS REFERENCE TO RELATED APPLICATIONS

This application is a continuation of U.S. application Ser. No. 12/955,037, filed Nov. 29, 2010, the entire contents of which are herein incorporated by reference.

TECHNICAL FIELD

The present disclosure relates generally to portable devices, and more particularly to a system and method for detecting and measuring impacts in handheld devices using an acoustic transducer.

BACKGROUND

People increasingly carry around wireless handheld devices in order to tackle busy lives. With the increased proliferation of such devices, distraction also increases, which makes users of the wireless handheld devices more prone to dropping the devices. When a dropped portable electronic device strikes another object, various types of failures may occur.

BRIEF DESCRIPTION OF THE DRAWINGS

Reference will now be made to the drawings, which show by way of example, embodiments of the present disclosure, and in which.

It will be noted that throughout the appended drawings, like features are identified by like reference numerals.

DETAILED DESCRIPTION

Figure 1:
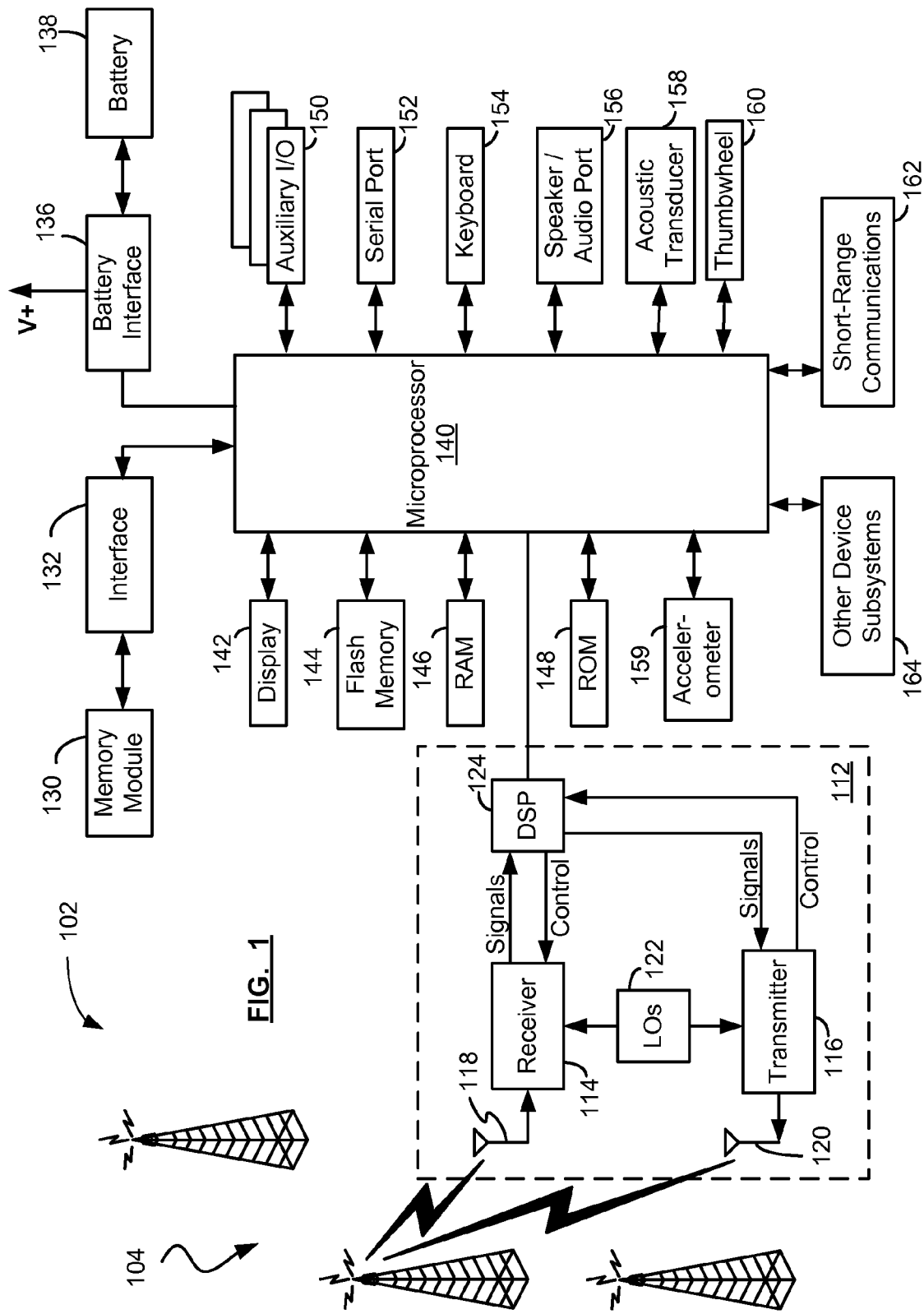
FIG. 1 shows in block diagram form a wireless device suitable for implementing a system and method for detecting impacts in handheld devices in accordance with one embodiment.

In one typical scenario, a developer of such a device may be interested in studying why products fail. In another typical scenario, a user may bring a failed device to a seller, manufacturer, repairer or other specialist to try to determine why the product failed or how severe the failure may be. When a portable electronic device has failed, it may be difficult to determine why the failure occurred. This difficulty may be increased when the failure occurs in the field, or outside of controlled conditions. It has been discovered that kinds and degrees of failure may be correlated to how often a device was dropped in the field, and/or the severity of the resulting impact(s). In some cases, information about drop rates and impacts can help specialists determine whether likely causes of failure may be design issues, manufacturing issues, abuse, "wear and tear," or other causes or combinations thereof.

Many existing apparatus or methods of evaluating impacts in handheld devices may require substantial added circuitry or specialized testing equipment. In addition to concerns about cost and complexity, there are concerns about whether such apparatus or methods are accurate or provide useful information about failures outside of a controlled testing environment.

The apparatus and method described herein may help address such concerns. In general, the apparatus and method detects impacts in portable electronic (typically handheld) devices and preserves information about those impacts.

One aspect of the present application provides a method in a wireless device for detecting and measuring impacts of the wireless device. The wireless device has a processor coupled to a memory and an acoustic transducer. The method comprises acquiring data from the acoustic transducer, the data acquisition including receiving a signal supplied at an input of the processor; saving the acquired data in the memory; detecting whether an impact has occurred; and halting data acquisition after the impact is detected. The method may also comprise activating the acoustic transducer by the processor, where the activation causes the acoustic transducer to provide the electrical input signal to the input of the processor. The activation may be initiated by a trigger indicating to the processor that the wireless device is in freefall. The wireless device may further include an accelerometer coupled to the processor, where the trigger includes the accelerometer supplying an electrical signal to a further input of the processor indicating that the wireless device is in freefall.

Another aspect of the present application provides a wireless device comprising a processor for controlling operation of the wireless device; an acoustic transducer coupled to an input of the processor; a memory coupled to the processor; and a storage device coupled to the processor. The wireless device includes an impact detection module resident in the memory for execution by the processor. The impact detection module is configured to: acquire data from the acoustic transducer; save the acquired data in the memory; detect whether an impact has occurred; and halt data acquisition after the impact is detected. The impact detection module may be further configured to activate the acoustic transducer, the activation causing the acoustic transducer to provide the electrical input signal to the processor. The activation may be initiated by a trigger indicating to the processor that the wireless device is in freefall. The wireless device may further include an accelerometer coupled to a further input of the processor. The trigger may include the accelerometer supplying an electrical signal to the processor indicating that the wireless device is in freefall.

Another aspect of the present application includes a method in an electronic device for having memory and an acoustic transducer. The method comprises receiving an impact signal, the impact signal being a function of an input to the acoustic transducer; determining that an impact has occurred as a function of the impact signal; determining a severity of the impact as a function of the impact signal; and storing the determination that an impact has occurred and the severity of the impact in memory.

Reference is first made to FIG. 1, which shows a block diagram illustrating a portable wireless device 102 that may be used for implementing a system and method for detecting and measuring impacts in handheld devices in accordance with one aspect of the present disclosure. The wireless device 102 (which may be a device sized to be held in hand and consequently at risk of being dropped) communicates through a wireless communication network 104. The wireless network 104 includes antenna, base stations, and supporting radio equipment as for supporting wireless communications between the wireless device 102 and other devices connected to wireless network 104. The wireless network 104 may be coupled to a wireless network gateway and to a wide area network, shown in FIG. 2.

In one embodiment, the wireless device 102 is a two-way communication device having at least voice and/or data communication capabilities, including the capability to communicate with other computer systems. In one embodiment, the wireless device 102 is a handheld device. Depending on the functionality provided by the wireless device 102, it may be referred to as a data messaging device, a two-way pager, a cellular telephone with data messaging capabilities, a wireless Internet appliance, a data communication device (with or without telephony capabilities), a portable media or music player, a handheld device, or a wireless handheld device. The wireless device 102 may communicate with any one of a plurality of fixed transceiver stations within its geographic coverage area.

The wireless device 102 may incorporate a communication subsystem 112, which includes a receiver 114, a transmitter 116, and associated components, such as one or more antenna elements 118 and 120, local oscillators (LOs) 122, and a processing module such as a digital signal processor (DSP) 124. In one embodiment, the antenna elements 118 and 120 may be embedded or internal to the wireless device 102. As will be apparent to those skilled in the field of communications, the particular design of the communication subsystem 112 depends on the wireless network 104 in which the wireless device 102 is intended to operate.

The wireless device 102 may send and receive communication signals over the wireless network 104 after the required network registration or activation procedures have been completed. Signals received by the antenna 118 through the wireless network 104 are input to the receiver 114, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 124. In a similar manner, signals to be transmitted are processed, including modulation and encoding, for example, by the DSP 124. These DSP-processed signals are input to the transmitter 116 for digital-to-analog (D/A) conversion, frequency up conversion, filtering, amplification, and transmission to the wireless network 104 via the antenna 120. The DSP 124 not only processes communication signals, but also provides for receiver and transmitter control. For example, the gains applied to communication signals in the receiver 114 and the transmitter 116 may be adaptively controlled through automatic gain control algorithms implemented in the DSP 124.

Network access is associated with a subscriber or user of the wireless device 102 via a memory module, such as a memory module 130, which may be a Subscriber Identity Module (SIM) card for use in a GSM network or a USIM card for use in a UMTS. The SIM card is inserted in or connected to an interface 132 of the wireless device 102 in order to operate in conjunction with the wireless network 104. Alternatively, the wireless device 102 may have an integrated identity module for use with systems such as Code Division Multiple Access (CDMA) systems.

The wireless device 102 may include a power pack that serves as a source of power for the electronic components of the device. In FIG. 1, the power pack is represented as a battery 138. The wireless device 102 includes a battery interface 136 for receiving one or more rechargeable batteries 138. The battery 138 provides electrical power to at least some of the electrical circuitry in the wireless device 102, and the battery interface 136 provides a mechanical and electrical connection for the battery 138. The battery interface 136 is coupled to a regulator (not shown) which provides power V+ to the circuitry of the wireless device 102.

The wireless device 102 includes a microprocessor 140 which controls the overall operation of the wireless device 102. Communication functions, including at least data and voice communications, are performed through the communication subsystem 112. The microprocessor 140 also interacts with additional device subsystems such as a display 142, a flash memory 144, a random access memory (RAM) 146, a read-only memory (ROM) 148, auxiliary input/output (I/O) subsystems 150, a Universal Serial Bus (USB) port 152, a keyboard or keypad 154, a speaker or audio port 156 for connecting to, for example a set of headphones, an acoustic transducer 158 such as a microphone, an accelerometer 159, a navigation input device 160 such as a clickable thumbwheel, thumbwheel, or set of scroll buttons or clickable trackball or track pad, a short-range communications subsystem 162, and any other device subsystems generally designated as 164. Other device subsystems may include a high definition multimedia interface (HDMI) port, mini-HDMI port, or similar known or yet to be developed digital interface ports. Some of the subsystems shown in FIG. 1 perform communication-related functions, whereas other subsystems may provide "resident" or on-device functions. Notably, some subsystems, such as the keypad 154, the display 142, and the navigation input device 160, for example, may be used for both communication-related functions, such as entering a text message for transmission over the wireless network 104, and executing device-resident functions such as a calculator or task list. In one example, the keyboard 154 and the display 142 may be implemented as an integrated touch screen device where a user touches the touch screen 142, 154 to provide input for the microprocessor 140 in response to options shown on the display 142. Operating system software used by the microprocessor 140 is preferably stored in a persistent store such as the flash memory 144, which may alternatively be the ROM 148 or similar storage element. Those skilled in the art will appreciate that the operating system, specific device applications, or parts thereof, may be temporarily loaded into a volatile store such as the RAM 146.

The microprocessor 140, in addition to its operating system functions, enables execution of software applications on the wireless device 102. A predetermined set of applications that control basic device operations, including data and voice communication applications, will normally be installed on the wireless device 102 during or after manufacture. The wireless device 102 may include a personal information manager (PIM) application having the ability to organize and manage data items relating to a user such as, but not limited to, instant messaging, email, calendar events, voice mails, appointments, and task items. One or more memory stores may be available on the wireless device 102 to facilitate storage of information, such as the flash memory 144, the RAM 146, the ROM 148, the memory module 130, or other types of memory storage devices such as external hard drives, flash drives, or FLASH memory cards represented by the other device subsystems 164, such as Secure Digital (SD) cards, mini SD cards, micro SD cards, etc.

The PIM and/or media applications have the ability to send and receive data items via either the wireless network 104 or a link to a computer system. The link to the computer system may be via the serial port 152 or the short-range communications subsystem 162. Additional applications may also be loaded onto the wireless device 102 through the wireless network 104, the auxiliary I/O subsystem 150, the serial port 152, the short-range communications subsystem 162, or any other suitable subsystem 164, and installed by a user in the RAM 146 or a non-volatile store such as the ROM 148 for execution by the microprocessor 140. Such flexibility in application installation increases the functionality of the wireless device 102 and may provide enhanced on-device functions, communication-related functions, or both. For example, secure communication applications may enable electronic commerce functions and other such financial transactions to be performed using the wireless device 102.

In a data communication mode, a received data signal representing information such as a text message, an email message, a media file to be transferred, or Web page download will be processed by the communication subsystem 112 and input to the microprocessor 140. The microprocessor 140 will further process the signal for output to the display 142 or alternatively to the auxiliary I/O device 150. A user of the wireless device 102 may also compose data items, such as email messages, for example, using the keypad 154 and/or the navigation input device 160 in conjunction with the display 142 and possibly the auxiliary I/O device 150. The keypad 154 may be either a complete alphanumeric keypad or telephone-type keypad or a keypad displayed on the display 142 of the touch screen 142, 154.

For voice communications, the overall operation of the wireless device 102 is similar, except that the received signals would be output to the speaker or audio port 156 and signals for transmission would be generated by a transducer such as the acoustic transducer (or microphone) 158. Alternative voice or audio I/O subsystems, such as a voice message recording subsystem, may also be implemented on the wireless device 102. Although voice or audio signal output is typically accomplished primarily through the speaker or audio port 156, the display 142 may also be used to provide an indication of the identity of a calling party, duration of a voice call, or other voice call related information. Stereo headphones may also be used in place of the speaker 156.

The serial port 152 is normally implemented in a personal digital assistant (PDA) type communication device for which synchronization with a user's computer is a desirable, albeit optional, component. The serial port 152 enables a user to set preferences through an external device or software application and extends the capabilities of the wireless device 102 by providing for information, media file, or software downloads to the wireless device 102 other than through the wireless network 104.

The short-range communications subsystem 162 is an additional optional component which provides for communication between the wireless device 102 and different systems or devices, which need not necessarily be similar devices. For example, the subsystem 162 may include an infrared device and associated circuits and components, or a wireless bus protocol compliant communication mechanism such as a Bluetooth™ communication module to provide for communication with similarly-enabled systems and devices (Bluetooth™ is a registered trademark of Bluetooth SIG, Inc.). In another embodiment, the short-range communications subsystem 162 may be a wireless networking communications subsystem, conforming to IEEE 802.11 standards such as 802.11b, 802.11g, and/or 802.11n.

Figure 2:
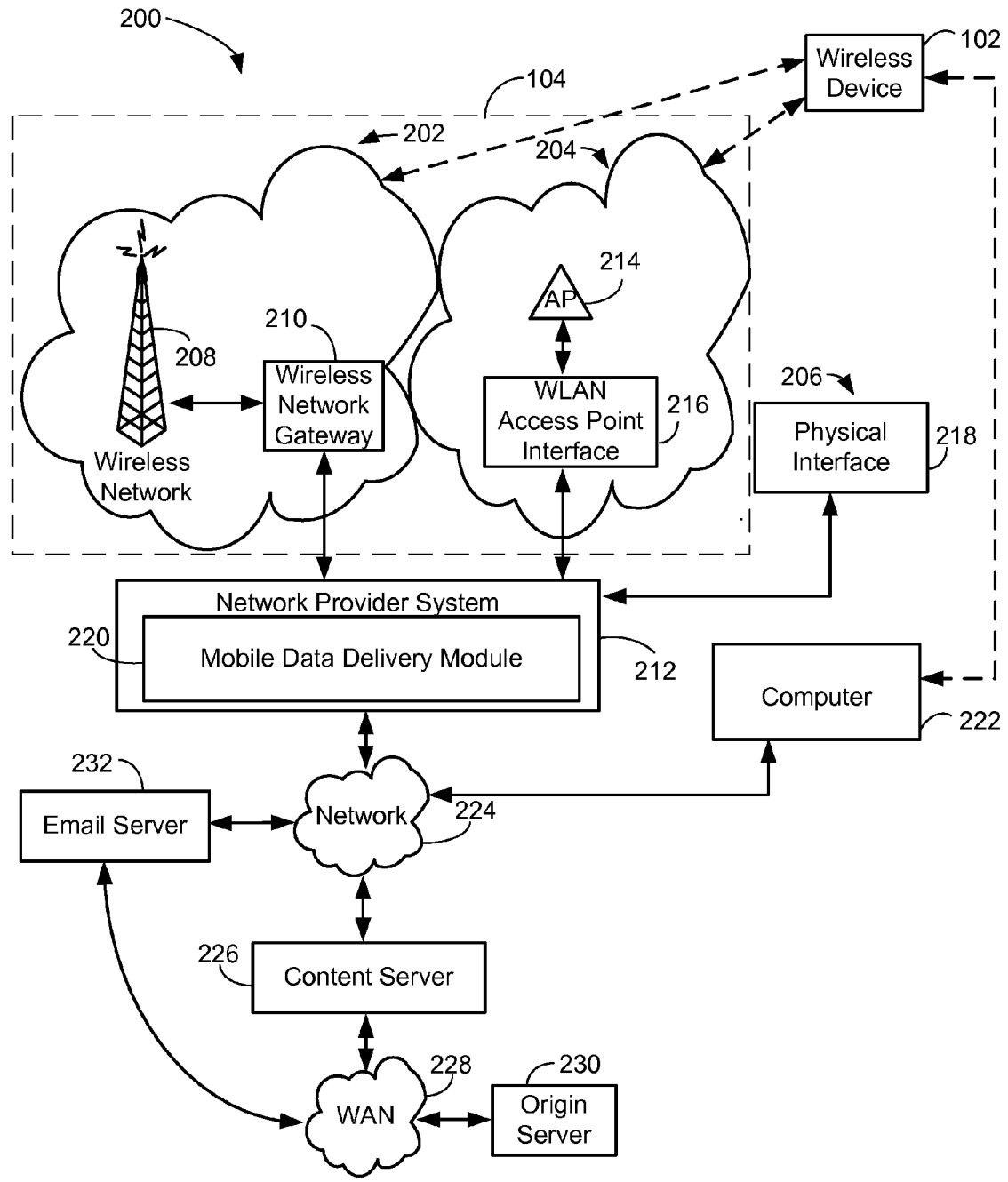
FIG. 2 shows in block diagram form a communication system suitable for providing the operating environment of the wireless device of FIG. 1 in accordance with one embodiment.

Reference is next made to FIG. 2, which shows a communication system 200 suitable for use with the wireless device 102 shown in FIG. 1. The communication system 200 generally includes one or more wireless devices 102 (only one of which is shown in FIG. 2) and the wireless network 104. The wireless network 104 may include a wireless Wide Area Network (WAN) 202, a Wireless Local Area Network (WLAN) 204, and/or other interfaces 206 (which may not necessarily be wireless).

Referring to FIG. 2, the wireless WAN 202 may be implemented as a packet-based cellular or mobile network that includes a number of base stations 208 (one of which is shown in FIG. 2) where each of the base stations 208 provides wireless Radio Frequency (RF) coverage to a corresponding area or cell. The wireless WAN 202 is typically operated by a cellular network service provider that sells subscription packages to users of the wireless devices 102. The wireless WAN 202 comprises a number of different types of networks, for example, Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network) or various other third generation networks such as EDGE (Enhanced Data rates for GSM Evolution), UMTS (Universal Mobile Telecommunications Systems), Evolution-Data Optimized (EV-DO), 3G or 4G based networks.

As shown in FIG. 2, the communications system 200 also includes a wireless network gateway 210 and one or more network provider systems 212. The wireless network gateway 210 provides translation and routing services between the network provider system(s) 212 and the WAN 202, which facilitates communication between the wireless devices 102 and other devices (not shown) connected, directly or indirectly, to the network provider system 212.

The WLAN 204 comprises a network which in some examples conforms to IEEE 802.11 standards such as 802.11b, 802.11g, and/or 802.11n; however, other communications protocols may also be used for the WLAN 204. The WLAN 204 includes one or more wireless RF Access Points (AP) 214 (one of which is shown in FIG. 2) that collectively provide a WLAN coverage area. For the embodiment depicted in FIG. 2, the WLAN 204 is operated by an enterprise (for example, a business or university in a building or campus type environment) and the access points 214 are connected to an access point (AP) interface 216. The AP interface 216 provides translation and routing services between the access points 214 and the network provider system 212 to facilitate communication between two or more of the wireless devices 102 and other devices (e.g., such as desktop computers) connected, directly or indirectly, to the network provider system 212. The AP interface 216 is implemented using a computer, for example, a server running a suitable computer program or software.

According to one embodiment, the other interfaces 206 may be implemented using a physical interface indicated by reference 218. The physical interface 218 includes an Ethernet, Universal Serial Bus (USB), Firewire, or infrared (IR) connection implemented to exchange information between the network provider system 212 and the wireless device 102.

The network provider system 212 comprises a server or server modules or a number of servers or server modules which are typically located behind a firewall (not shown). The network provider system 212 may include a number of modules including a mobile data delivery module 220. Various modules running on the network provider system 212 may be implemented as a number of services running on a single server or as a number of interconnected servers each running a software program to implement the functionality of the respective module. The network provider system 212 provides access for the wireless devices 102, through either the wireless WAN 202, the WLAN 204, or the other connection 206 to the devices connected, for example, through an enterprise network 224 (e.g., an intranet), to the network provider system 212. In one embodiment, the data delivery module 220 is implemented on a computer, such as the network provider system 212.

The enterprise network 224 comprises a local area network, an intranet, the Internet, a direct connection, or combinations thereof. The enterprise network 224 may comprise an intranet for a corporation or other type of organization. In at least some embodiments, the network provider system 212 is part of the enterprise network 224, and is located behind a corporate firewall and connected to the wireless network gateway 210 through the Internet. A computer 222 (e.g., a desktop or laptop computer) belonging to the user of the wireless device 102 is typically connected to the enterprise network 224. As described earlier, the wireless device 102 may be temporarily and directly connected to the computer 222 using, for example, the serial port 152. This direct connection may make use of a cradle or docking station connected to a serial port of the computer 222, where the mobile device 102 is placed in the cradle, therefore completing the serial connection between the mobile device 102 and the computer 222. Alternatively, the wireless device 102 may communicate with the computer 222 using the communication subsystem 112 and the WAN 202 and/or the short-range communications subsystem 162 and the WLAN 204.

As shown in FIG. 2, an application/content server 226 may be connected to the enterprise network 224 and also to another network, for example a Wide Area Network (WAN) 228. In some embodiments, an email server 232 and/or the content server 226 form part of the enterprise network 224. The WAN 228 may further connect to other networks. The WAN 228 may comprise or be configured with the Internet, a direct connection, a LAN, a wireless communication link, or any combination thereof. Content providers, such as Web servers, may be connected to the WAN 228, an example of which is shown in FIG. 2 as an origin server 230.

According to one embodiment, the mobile data delivery module 220 provides connectivity between the wireless WAN 202 and the WLAN 204 and the other connection 206 and devices and/or networks connected directly or indirectly to the network provider system 212. In one embodiment, the connectivity provided may be Hypertext Transfer Protocol (HTTP) based connectivity providing an Internet based service connection to devices connected to the wireless WAN 202, the WLAN 204, or the other connection 206 and devices and/or networks connected directly or indirectly to the network provider system 212. The network 224, the application/content server 226, the WAN 228, and the origin server 230, are individually and/or collectively in various combinations a content source for the network provider system 212. It will be appreciated that the system shown in FIG. 2 comprises but one possible communication network or configuration of a multitude of possible configurations for use with the wireless devices 102.

Figure 3:
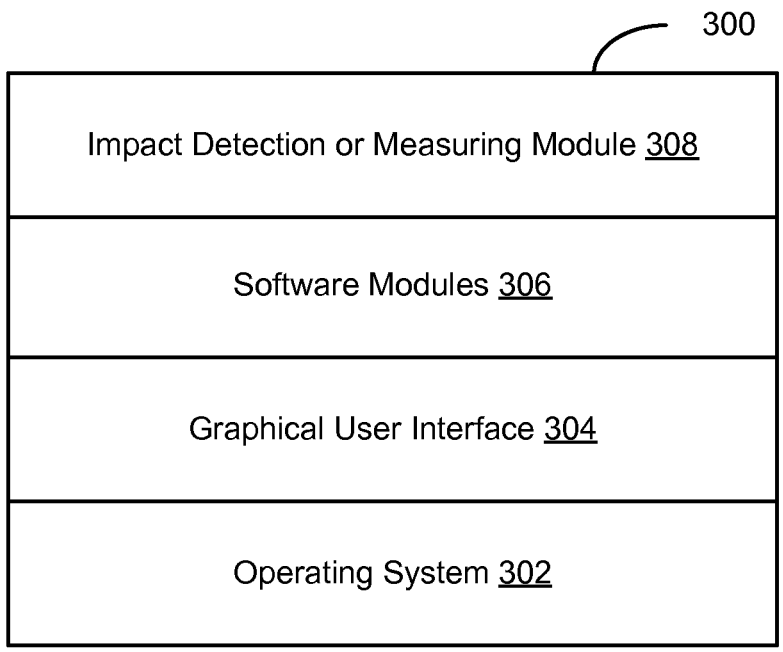
FIG. 3 shows in block diagram form the contents of a memory of the wireless device of FIG. 1.

Reference is next made to FIG. 3, which shows a block diagram illustrating a memory 300 of the wireless device 102. The memory 300 has various software components for controlling the wireless device 102 and may include, for example, the flash memory 144, the RAM 146, the ROM 148, the memory module 130 and/or the other device subsystems 164. In accordance with one embodiment, the wireless device 102 is intended to be a multi-tasking wireless communications device configured for sending and receiving data items and for making and receiving voice calls that also includes various applications enabling users to listen to music, watch video files, play games, view picture files, surf the internet wirelessly, etc. To provide a user-friendly environment to control the operation of the wireless device 102, an operating system (OS) 302 resident on the wireless device 102 provides a basic set of operations for supporting various applications typically operable through a graphical user interface (GUI) 304. For example, the operating system 302 provides basic input/output system features to obtain input from the auxiliary I/O 150, the keypad 154 or touch screen 142,154, the clickable trackball or track pad 160, and other input devices, and to facilitate output to the user via the display 142. The GUI 304 is typically a component of the operating system 302. One or more software modules 306 for managing communications or providing a personal digital assistant (PDA) or other functions may also be included. The memory 300 also includes an email and calendar client, which may be combined in, for example, a PIM application having email-based calendaring and scheduling functions. Typically, the PIM is installed as one of the software modules 306.

The memory 300 also includes an impact detection or measuring module 308. The impact detection or measuring module 308 interacts with aspects of the GUI 304 and OS 302 to provide for detecting and measuring the magnitude of impacts of the wireless device 102 as will be described in greater detail below. The impact detection or measuring module 308 may act on or with or in response to one or more elements of hardware. In one example, the impact detection or measuring module 308 may interact with an acoustic transducer 158, as described below. In another example, the impact detection or measuring module 308 may interact with an accelerometer, as described below. The instructions that may be executed by the impact detection or measuring module 308 may be integrated into the OS 302 or the GUI 304 and may be (but need not be) a discrete module 308 as shown in FIG. 3. In general, the impact detection or measuring module 308 (with associated hardware) may detect an occurrence of an impact, make a measurement as a function of the impact, and save and/or retrieve and/or process and/or organize data about impacts in the memory 300. The memory 300 may be used by the impact detection or measuring module 308 for saving information, either temporarily or permanently. Aspects of the operation of the impact detection or measuring module 308 and interaction with this module are described in more detail below.

Thus, the wireless device 102 includes computer executable programmed instructions for directing the wireless device 102 to implement various applications. The programmed instructions may be embodied in the one or more software modules 306 resident in the memory 300 of the wireless device 102. Alternatively, the programmed instructions may be tangibly embodied on a tangible computer readable medium (such as a DVD, CD, floppy disk or other storage media) which may be used for transporting the programmed instructions to the memory 300 of the wireless device 102 (e.g., A computer program product comprising a computer readable medium having computer readable code stored thereon, for execution by a processor).

Alternatively, the programmed instructions may be embedded in a computer-readable, signal-bearing medium (as opposed to the computer readable medium, discussed above) that is uploaded to the wireless network 104 by a vendor or supplier of the programmed instructions, and this signal-bearing medium may be downloaded through one or more of the interfaces 112, 150, 152, 162 to the wireless device 102 from, for example, the wireless network 104 by end users.

Figure 4:
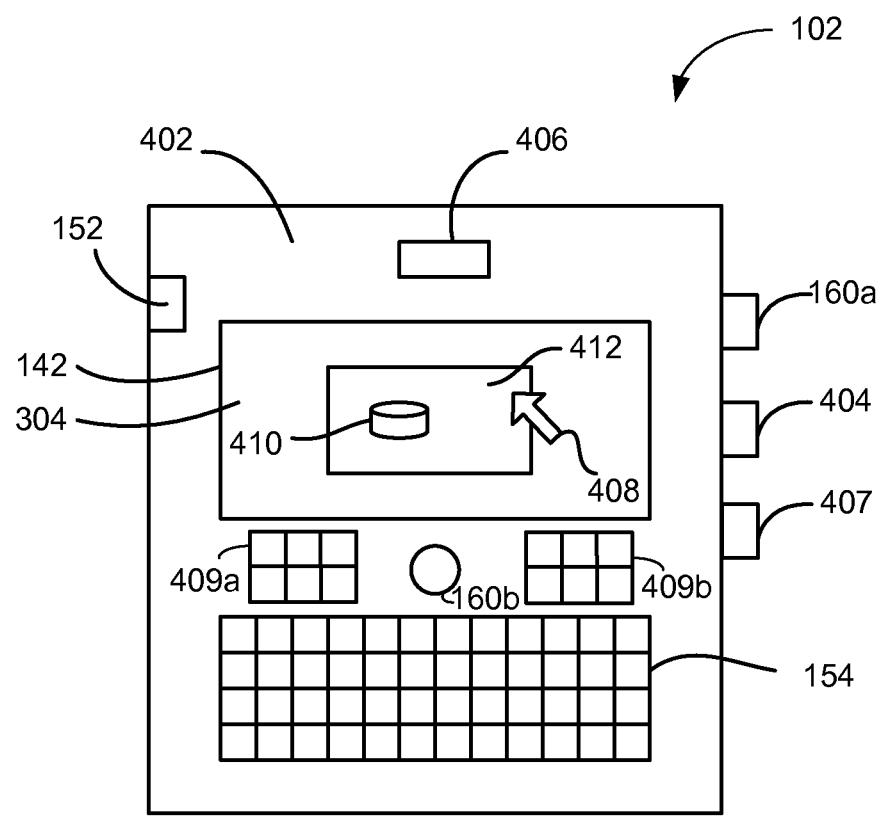
FIG. 4 is a front view illustrating the wireless device of FIG. 1.

Reference is next made to FIG. 4, which shows a front view of the wireless device 102. As mentioned above, the wireless device 102 may be a data and voice-enabled handheld device. The wireless device 102 includes a casing 402, the data or serial port 152, the display screen 142, the graphical user interface (GUI) 304, the keypad 154, the clickable thumb-wheel or scroll buttons 160a or other device for navigation such as a clickable trackball or track pad 160b, one or more input buttons 404 (e.g., select, cancel, talk, play, stop, fast forward, rewind, next, previous buttons), signal inputs/outputs 406 (e.g., direct wire connection or inductive coupling power connector input, acoustic transducer, speaker, data interface input, etc.), and an audio port 407. Alternatively, the discrete keypad 154 may not be used, the display 142 may occupy most of the front side of the casing 402, and the keypad 154 may be integrated with the display 142, as the display 142 is implemented as a touch screen 142, 154 display also accepting input from the user. Additionally, the wireless device 102 may have a number of navigation control buttons represented by numerals 409a and 409b. The navigation control buttons 409 may provide a number of functions such as a send and/or end key for a mobile telephone application of the wireless device 102, a menu key, an escape key, etc. The functions of the navigation control buttons 409 may be user configurable. Internally, the wireless device 102 includes one or more circuit boards (not shown), the microprocessor 140 (FIG. 1), the memory 300 (FIG. 3), the battery 138 (FIG. 1), the antennae 118, 120 (FIG. 1), etc., which may all be coupled to the signal inputs/outputs 406, the keypad 154, the display screen 142, the clickable thumbwheel 160, etc.

The microprocessor 140 is typically coupled to one or more input devices (e.g., the buttons 404, the keypad 154, the clickable thumbwheel 160) for receiving user commands or queries and the display 142 for displaying the results of these commands or queries. For example, user queries may be transformed into a combination of commands for producing one or more tables of output data which may be incorporated in one or more display pages for presentation to the user. The microprocessor 140 is also coupled to the memory 300.

A user may interact with the wireless device 102 and its software modules 306, 308 using the GUI 304. The GUI 304 is controlled by the operating system 302 (FIG. 3) and provides a display format enabling the user to choose commands, execute application programs, manage computer files, and perform other functions by selecting pictorial representations (i.e., icons), or selecting items from a menu through the use of an input or pointing device such as the navigation input device 160 and/or the keypad 154. Generally, the GUI 304 is used to convey information and receive commands from users and generally includes a variety of GUI objects or controls including icons, toolbars, drop-down menus, pop-up menus, text, dialog boxes, buttons, etc. A user typically interacts with the GUI 304 presented on the display 142 by using an input, pointing device, or touch screen device to position a pointer or cursor 408 over an object 410 (i.e., "pointing" at the object) and by "clicking" on the object 410 (e.g., by depressing the navigation input device 160 or a button on the keyboard 154, touching an appropriate position on the touch screen 142, 154, etc.). This is often referred to as a point-and-click or selection operation. Typically, the object 410 may be highlighted (e.g., shaded) when it is selected or pointed at by the pointer or cursor 408 to indicate that the object 410 is selectable.

Typically, a GUI-based system presents application, status, and other information to the user in windows appearing on the display 142. A window 412 is a display area shown within the display 142, typically rectangular, in which a user may view an application or document. The window 412 may be open, closed, displayed full screen, reduced to an icon, increased or reduced in size, or moved to different areas of the display 142. Multiple windows 412 may be displayed simultaneously. For example, the windows 412 may be displayed within other windows, overlapped with other windows, or tiled within the display area.

Acoustic transducers such as microphones 158 and speakers 156 have been mentioned previously. For purpose of illustration, the following discussion will be directed to an acoustic transducer in the form of a microphone, which can be utilized to determine whether an impact has taken place as well as the severity of the impact. A microphone is an acoustic-to-electric transducer or sensor that converts sound into an electrical signal (that is, a microphone receives sound as input and generates as output an electromagnetic signal as a function of the received sound), and is usually called a microphone because it is designed to be most efficient in the audible range of the spectrum. The most common design of microphone employs a thin membrane that vibrates in response to sound pressure. This vibration is subsequently translated into an electrical signal. Most audio microphones use either electromagnetic induction (e.g., in the case of a dynamic microphone), capacitance change (e.g., as in a condenser microphone), piezoelectric generation, or light modulation to produce the electrical signal from mechanical vibration.

A typical sensing element of the acoustic transducer is an electret condenser microphone, which comprises an electret membrane, metal electrode, and field effect transistor that can be configured to yield good signal-to-noise ratios (e.g., greater than 60 dB) and good frequency response (e.g., 20 to 16,000 Hz). Two stages of amplification may be provided to condition the low-level signal from the microphone for input into a processor. The output from a typical electret condenser microphone is bipolar, but may also be configured in a unipolar fashion.

An electret microphone is a relatively new type of capacitor microphone. A permanent charge in an electret material is used as opposed to an externally applied charge used in condenser microphones. An electret is a ferroelectric material that has been permanently electrically charged (e.g., polarized). This is done by embedding a static charge in an electret by alignment of the static charges in the material, similar to the way a magnet is made by aligning the magnetic domains in a piece of iron.

Because of good performance, ease of manufacturing, and low cost, many microphones currently in use are electret microphones. Electret microphones were once considered low quality but can now rival traditional condenser microphones in most respects and offer long term stability and the flat response needed for a measurement microphone, such as for detecting and measuring impacts in handheld devices in accordance with one aspect of the present description.

Unlike other capacitor microphones, electret microphones do not use a polarizing voltage. Electret microphones may contain an integrated preamplifier that does need power. The preamplifier may be phantom powered in sound reinforcement and studio applications. Multimedia microphones for computing applications typically employ a 3.5 mm plug with the ring receiving power via a resistor from a power supply, such as a 5 volt supply in the computer. In the case of an electret microphone employed in a handheld wireless device such as the wireless device 102, the electret microphone may be hard wired to an input of a processor (e.g., the microprocessor 140) and may receive power at a lower voltage. In one embodiment, the acoustic transducer 158 may be an electret microphone. However, this is merely exemplary and any suitable type of acoustic transducer or microphone may be used for the acoustic transducer 158. (Further, many kinds of speakers work much like microphones in reverse, receiving an electromagnetic signal as input and generating sound as output. For purposes of simplicity, however, it is assumed that the microphone will be a suitable acoustic transducer).

According to one aspect of the present description, the acoustic transducer 158 may be used to detect whether there has been an impact and/or measure the severity of an impact of the handheld wireless device 102. The wireless device may optionally include an accelerometer 159, which may also be employed for impact detection and evaluating the severity of an impact of the handheld wireless device 102. In other words, the acoustic transducer 158 may operate in place of or in concert with an accelerometer 159. A possible drawback of accelerometers of the type that are incorporated into handheld wireless devices is that many accelerometers may lack ability to measure impacts in a meaningful range. A typical accelerometer may measure accelerations or decelerations (e.g., shocks) up to about 10 times gravity (10 g). A wireless device that is dropped by a user and that lands on a hard surface, by contrast, can experience a shock ranging anywhere from 1500 g to 3000 g, or more. According to different aspects of the present description, the acoustic transducer 158 may be used alone in detecting and/or measuring the severity of an impact of the wireless device 102 or the accelerometer 159 may be used in conjunction with the acoustic transducer 158 in detecting and/or measuring the severity of an impact of the wireless device 102.

Piezoelectric devices may also be incorporated into wireless devices in order to detect and/or measure the severity of an impact. Once again, the acoustic transducer 158 may operate in place of or in concert with such a piezoelectric device. One potential drawback of piezoelectric devices may relate to the practicalities associated with installation. For example, integrating a piezoelectric device into the wireless device may entail that added charge or coulomb measuring circuitry be placed in the logic, or analog, design of the wireless device. Depending on the design criteria of a particular application, incorporating piezoelectric devices into the wireless device 102 and adding circuitry to the logic design of the wireless device 102 may be undesirable. The acoustic transducer 158 is normally a standard pre-existing component of the wireless device 102 (e.g., implemented as a microphone) and is therefore already available for use in applications such as detecting and measuring impacts of the wireless device 102 (in addition to its more conventional functions). The acoustic transducer 158 may realize another advantage in that the acoustic transducer 158 may already be located in a good location on the wireless device 102 for receiving the structural vibrations caused by an impact with the wireless device 102. Also, the acoustic transducer 158 is typically small and it may be little work to relocate the position of the acoustic transducer 158 in the wireless device 102 during a redesign of the wireless device 102 in order to improve the position of the acoustic transducer 158 in the wireless device 102 for receiving the structural vibrations caused by an impact with the wireless device 102.

According to one aspect of the present disclosure, the acoustic transducer 158 is used to detect and/or measure the severity of an impact of the wireless device 102. It may be useful to have data concerning how often the wireless device 102 was dropped in the field and the severity of such drops in order to understand the typical use case of the wireless device 102. It may be difficult for someone (such as a seller, manufacturer or repairer) to determine exactly why the wireless device 102 might have faded, when that person did not witness the circumstances in the field that may have led up to the failure. If accurate data were available on how often and how severely the device 102 was dropped in the field, some correlation may be drawn between failure rates and drop rates of the wireless devices 102. Additionally, as already noted, information about impacts can be useful in helping likely causes of failure and perhaps how to reduce the chances of failure.

Figure 5:
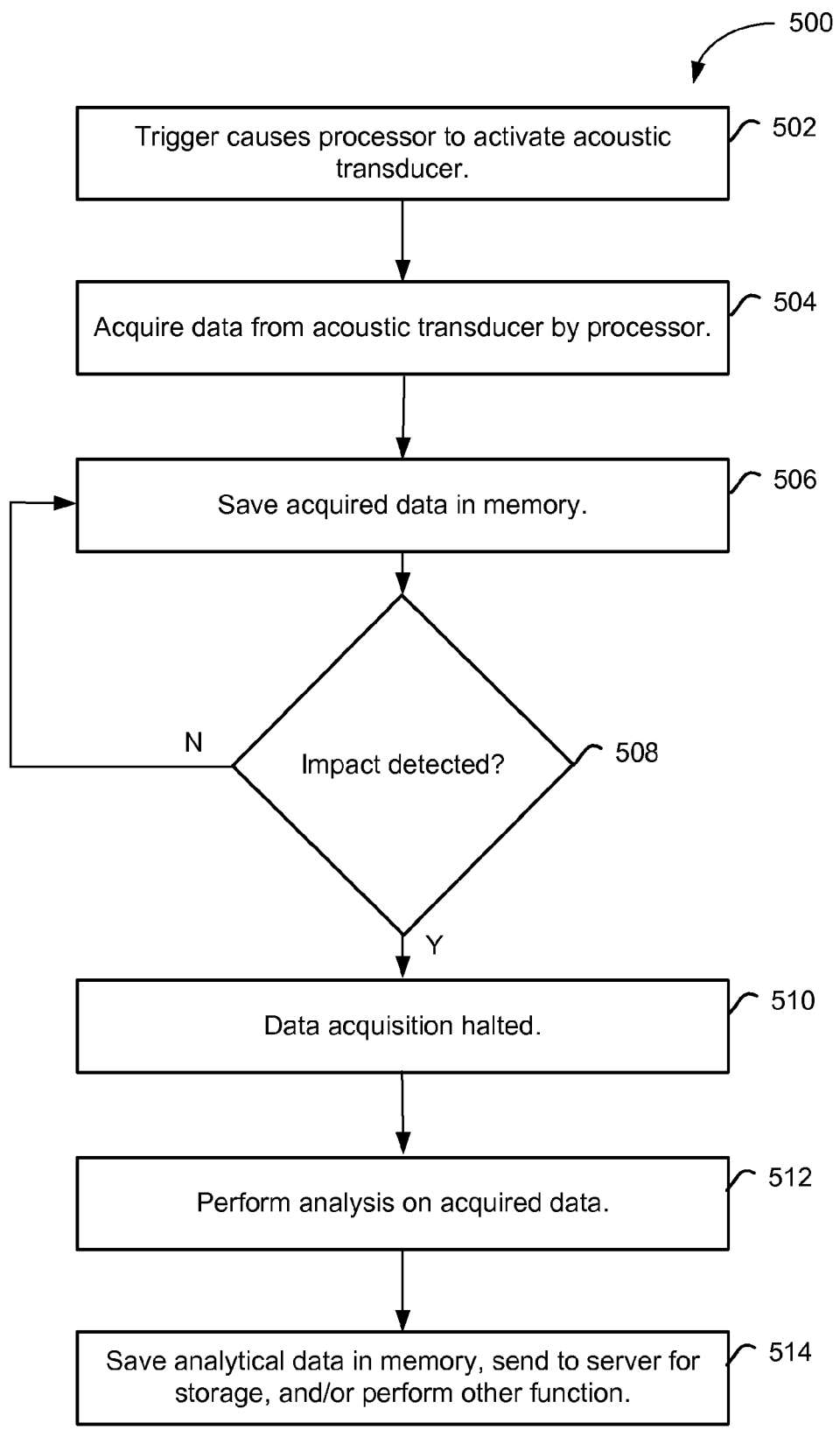
FIG. 5 shows in block diagram form a flow chart illustrating a method for detecting and measuring impacts in wireless handheld devices in accordance with one embodiment.

Referring now to FIG. 5, a flow chart is shown illustrating a method 500 for detecting and measuring impacts in wireless handheld devices in accordance with one aspect of the present disclosure. In general, the method may be carried out by instructions in the impact detection or measuring module 308, as described above, which may be executed by a processor such as microprocessor 140. A first block 502 of the method 500 is optional. Some mechanism may trigger the data acquisition mode of the acoustic transducer 158 coupled to one or more inputs of the microprocessor 140 in order to acquire data from the acoustic transducer 158. In one example, at the block 502, a trigger causes the processor (e.g., the microprocessor 140) to activate the acoustic transducer (e.g., the acoustic transducer 158) and acquire data from the acoustic transducer 158 when it is indicated that the wireless device 102 is in freefall and that an impact with an object such as the ground is possible (or perhaps imminent). In one example, the trigger may be supplied by the accelerometer 159, which supplies an electrical signal to the microprocessor 140 causing the microprocessor 140 to interpret that the wireless device 102 has entered a state of freefall (e.g., has experienced an acceleration at or near 9.8 m/s/s). Once the microprocessor 140 calculates that the wireless device 102 is in a state of freefall based on such a trigger, the acoustic transducer 158 may be activated and the microprocessor 140 may begin to acquire the electromagnetic signal output supplied by the acoustic transducer 158 at a block 504. Generally speaking, data acquired from the acoustic transducer 158 may be indicative of the severity of an impact, and may also be indicative of whether an impact has in fact occurred. Data acquired from the acoustic transducer 158 may also include information indicative of conditions before or after an impact, and whether an impact is followed by another impact. The data acquisition may include sampling of the data, that is, a sampled discrete signal may be generated as a function of the continuous input to the acoustic transducer 158. The processor 140 may receive, for example, samples of an electrical signal supplied to an input port of the microprocessor 140 by the acoustic transducer 158. In one example, the acoustic transducer 158 supplies the samples, which are first interpreted by a codec. Optionally, for increased resolution, a high speed analog-to-digital (A/D) converter and analog switch may be placed in-between the acoustic transducer 158 and input port of the processor 140, allowing the processor 140 to capture data directly, thereby eliminating the use of a codec. While the accelerometer 159 is used as an example of a trigger that may provoke data acquisition from the acoustic transducer 158, use of the accelerometer 159 as such a trigger is exemplary and any suitable trigger may be used to provoke data acquisition from the acoustic transducer 158. Other possible triggers include gyroscopes and/or altimeters.

As mentioned above, the block 502 that details the use of a trigger for provoking data acquisition from the acoustic transducer 158 is optional. Alternatively, the acoustic transducer 158 may be continually monitored and the block 504 may be the first block in the method 500. In another alternative, the acoustic transducer 158 may be polled on a periodic basis (e.g., an instantaneous or nearly instantaneous sample could be taken in time intervals, for example every 0.01 ms, and the acoustic transducer data acquisition mode fully engaged when a steep slope is detected between adjacent samples indicating that an impulse is being placed on the mechanical input of the acoustic transducer 158).

Next at a block 506, the data acquired from the acoustic transducer 158 is saved in memory (e.g., the memory 300). Upon impact of the wireless device 102 with an object such as the floor, the acoustic transducer 158 generates an electrical pulse that may be proportional to the severity of the impact. This electrical pulse is supplied to the input of the microprocessor 140 to which the acoustic transducer 158 is coupled. The data representing the electrical pulse is saved, for example in a log in the memory 300. The log may also record details such as the time of the impact or the location of the impact based on GPS data determined by the wireless device 102. The data associated with a particular impact event that is saved in the memory 300 is referred to as an impact profile.

Next at a block 508, the method 500 determines whether the impact has occurred. Generally speaking, the data received by the processor may be a function of an event that has caused the movable parts of the acoustic transducer 158 to move outside the ordinary parameters of motion, from which the processor may determine that an impact has occurred, and the severity of the impact as well. Once the impact has been determined to have occurred and the relevant data (e.g., the impact profile) has been acquired by the acoustic transducer 158 and saved in the memory 300, data acquisition may be halted at the block 510. Data acquisition may, but need not, halt promptly after an impact; in some embodiments, data acquisition may continue for some time (such as a few seconds) after an impact is detected. The determination as to whether the impact has occurred may be performed by the microprocessor 140 reviewing the data supplied by the acoustic transducer 158 to see when the magnitude or spectral signature of the voltage change supplied by the acoustic transducer 158 indicates that the impact has occurred. Alternatively, if the optional block 502 was used employing the accelerometer 159, the accelerometer 159 may also be monitored through the blocks 504, 506, and 508 until a significant deceleration has been detected. For example, in the case of a typical accelerometer integrated into a portable electronic device having a maximum measurable deceleration in the neighborhood of 10 g, the processor may determine that the impact has occurred when the accelerometer supplies an electrical signal indicating that a deceleration near, at, or above 10 g has occurred.

While the blocks 504, 506, and 508 are illustrated as discrete blocks, the blocks 504, 506 and 508 are typically performed simultaneously or nearly simultaneously (e.g., the data acquired from the acoustic transducer 158 is saved in the memory 300 as it is being acquired and the processor 140 is continually monitoring the data to determine when the impact has occurred after which the data acquisition terminates at the block 510).

Next, at a block 512, an analysis may be performed on the impact profile saved in the memory 300. The wireless device 102 may be initially supplied to the user containing data that enables the processor 140 to analyze impact profiles and measure or estimate the severity of an impact based on the saved impact profile that represents the magnitude or spectral signature of the voltage change supplied by the acoustic transducer 158 to the processor 140 during the impact event. In one example, the wireless device 102 may determine from an impact profile that an impact of 2000 g occurred at time X and this information may be recorded in the memory 300. Further, the original impact profile may optionally be deleted once the analysis is complete in order to save storage space in the memory 300. However, the block 512 is optional and, alternatively, the impact profile may be saved in the memory 300 without any analysis being performed on the profile.

Next, at a block 514, the analytical result or analytical data of any analysis performed at the block 512 may be saved in the memory 300. Optionally, the impact profile and/or the analytical data may be sent to a server such as one or more of the servers 226, 230, or 232 using the system 200, for storage or reporting. Other functions may also be performed at the block 514. For example, if the wireless device 102 determines, using the method 500, that indeed a drop impact has been detected, an alarm may sound on the wireless device 102 to alert the user in the event that the drop was unintentional to give the user an opportunity to retrieve the wireless device 102. An alarm may include an audible alarm emitted using the speaker 156 and/or a visual alarm displayed on the display 142. In another example, if the wireless device 102 determines, using the method 500, that indeed a drop impact has been detected, an automatic diagnostics procedure may be initiated on the wireless device 102. Optionally, if the diagnostics procedure indicates problems with the wireless device 102 after the drop event, the user could be notified of these problems (e.g., using the speaker 156 and/or the display 142) and/or the problems may be automatically reported to a system administrator (e.g., using the system 200) to ensure that the wireless device 102 is promptly repaired or replaced.

While the blocks of the method 500 are shown and described as occurring in a particular order, it should be understood that the order of the blocks of the method 500 are not intended to be limiting and that the steps may be reordered into any suitable order and that some of the steps could occur simultaneously, as mentioned above.

The embodiments of the present disclosure described above are intended to be examples only. Those of skill in the art may effect alterations, modifications and variations to the particular embodiments without departing from the intended scope of the present disclosure. In particular, selected features from one or more of the above-described embodiments may be combined to create alternative embodiments not explicitly described, features suitable for such combinations being readily apparent to persons skilled in the art. The subject matter described herein in the recited claims intends to cover and embrace all suitable changes in technology.

The invention claimed is:

1. A method in a wireless device, the method comprising:
   in response to a trigger indicating that the wireless device is in freefall, activating and acquiring data from an acoustic transducer of the wireless device;
   determining whether an impact of the wireless device has occurred; and
   if it is determined that an impact of the wireless device has occurred, storing the data acquired by the acoustic transducer in a memory of the wireless device for subsequent processing of the stored data.

2. The method according to claim 1, further comprising:
   halting data acquisition by the acoustic transducer after determining that an impact of the wireless device has occurred.

3. The method according to claim 1, wherein the trigger comprises an indication supplied by an accelerometer of the wireless device indicating that the wireless device is in freefall.

4. The method according to claim 3, wherein the impact of the wireless device is determined to have occurred based on data acquired from the accelerometer.

5. The method according to claim 1, wherein the impact of the wireless device is determined to have occurred based on the data acquired from the acoustic transducer.

6. The method according to claim 1, further comprising:
estimating the severity of the impact based on the data stored in the memory.

7. The method according to claim 6, wherein the severity of the impact is estimated, based on the data stored in the memory, using a magnitude or spectral signature of a voltage change detected by the acoustic transducer.

8. The method according to claim 7, wherein the magnitude or spectral signature of the voltage change is used to estimate a deceleration due to the impact of the wireless device of up 3000 times gravity (3000 g).

9. The method according to claim 7, further comprising:
sending either the data acquired from the transducer or data representing the estimated severity of the impact to a server.

10. The method according to claim 7, further comprising:
storing data representing the estimated severity of the impact in the memory.

11. A wireless device comprising:
an acoustic transducer;
a memory storing executable instructions for an impact detection module; and
a processor coupled to the acoustic transducer and the memory, the processor configured when the impact detection module is executed to:
in response to a trigger indicating that the wireless device is in freefall, activate and acquire data from an acoustic transducer of the wireless device;
determine whether an impact of the wireless device has occurred; and
if it is determined that an impact of the wireless device has occurred, store the data acquired by the acoustic transducer in the memory for subsequent processing of the stored data.

12. The wireless device according to claim 11, wherein the processor is further configured to halt data acquisition by the acoustic transducer after determining that an impact of the wireless device has occurred.

13. The wireless device according to claim 11, wherein the wireless device further comprises:
an accelerometer configured to supply an indication to the processor that the wireless device is in freefall, the indication providing the trigger for the processor to activate and acquire data from the acoustic transducer.

14. The wireless device according to claim 13, wherein the processor is configured to determine whether the impact of the wireless device based on data acquired from the accelerometer.

15. The wireless device according to claim 11, wherein the processor is configured to determine whether the impact of the wireless device based on the data acquired from the acoustic transducer.

16. The wireless device according to claim 11, wherein the processor is configured to estimate the severity of the impact based on the data stored in the memory.

17. The wireless device according to claim 16, wherein the processor is further configured to estimate the severity of the impact, based on the data stored in the memory, using a magnitude or spectral signature of a voltage change detected by the acoustic transducer.

18. The wireless device according to claim 17, wherein the processor is configured, based on the magnitude or spectral signature of the voltage change, to estimate a deceleration due to the impact of the wireless device of up 3000 times gravity (3000 g).

19. The wireless device according to claim 17, wherein the processor is further configured to send either the data acquired from the transducer or data representing the estimated severity of the impact to a server.

20. The wireless device according to claim 17, wherein the processor is further configured to store data representing the estimated severity of the impact in the memory.

* * * * *